April 20, 1971 J. E. EIDE 3,575,824

METHOD OF MAKING A THIN MAGNETIC FILM STORAGE DEVICE

Original Filed Nov. 12, 1965

INVENTOR:
JOHN E. EIDE,
BY [signature]
HIS ATTORNEY.

United States Patent Office 3,575,824 Patented Apr. 20, 1971

3,575,824
METHOD OF MAKING A THIN MAGNETIC FILM STORAGE DEVICE

John E. Eide, Syracuse, N.Y., assignor to General Electric Company

Original application Nov. 12, 1965, Ser. No. 507,357. Divided and this application Dec. 23, 1968, Ser. No. 804,034
Int. Cl. C23b *5/48;* G11b *5/00;* B41m *3/08*
U.S. Cl. 204—15 3 Claims

ABSTRACT OF THE DISCLOSURE

The invention relates to a method of fabricating thin magnetic film storage devices and more specifically to the making of thin magnetic film storage devices in a matrix structure wherein each storage element has a closed flux path.

Figure 1:
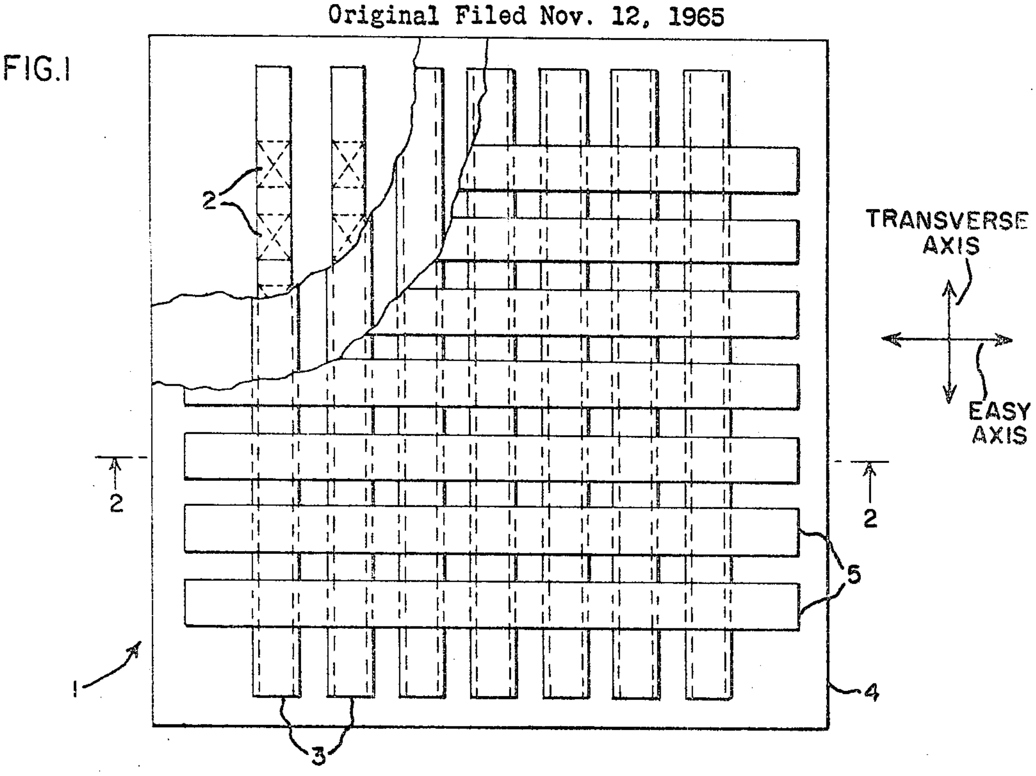

A first plurality of parallel conductors is formed by depositing a conducting layer upon a layer of magnetic film earlier deposited on a base plate and the two are etched into parallel strips. This is followed by the electrodeposition of a magnetic film about these conductors to form a closed magnetic flux path about the individual strips.

After laying down an insulating layer, a second plurality of parallel conductors is arranged over the first plurality of conductors and orthogonal thereto.

The present application is a division of application S.N. 507,357, filed Nov. 12, 1965 and now abandoned.

The invention relates, in general, to thin magnetic film storage devices. More specifically, the invention is directed to a novel thin film storage matrix structure having a closed flux path for each storage element, and to a method for fabricating same. The invention is of particular importance in a nondestructive readout mode of operation.

The use of thin magnetic films has been found to offer much advantage with respect to information storage and retrieval in complex computer equipment and the like as compared to bulk type magnetic elements, such as core structures. Thin film devices respond very rapidly to applied information; i.e., a rapid change in flux in the magnetic films can be made to occur. Thus, they can be operated at extremely high frequencies, in the tens of magacycles regions, and with extremely low power requirements. Having a planar configuration, they require but a fraction of the volume as compared to bulk type magnetic devices. The packing density of discrete information elements may be much higher. Further the geometry of the thin film devices is compatible with that of integrated electronic circuitry.

In the construction of thin magnetic film storage matrices an anisotropic magnetic film, polarized so as to exhibit a remanent magnetization along only a single axis, termed the "easy" axis, is deposited onto a supporting substrate. Formed within the film are a number of discrete storage elements or domains, within each of which the magnetization is set in one of two opposing directions along said "easy" axis so as to store a binary "1" or "0" bit information. A first set of inductively coupled parallel conductors, commonly termed digit conductors, overlay the thin film in an alignment which produces a magnetic field within the film along the "easy" axis. A second set of inductively coupled parallel conductors, commonly termed drive or word conductors, overlay the thin film in orthogonal relationship with said first set of conductors so as to establish a magnetic field along the axis transverse to the "easy" axis. The storage elements are formed under the intersections of the overlaying sets of conductors. Storage is accomplished by energizing selected pairs of the digit and drive conductors. A nondestructive readout is accomplished by energization of solely the drive conductors, with sensing of the readout information provided either by the digit conductors or a third set of conductors inductively coupled to the storage elements.

It is obviously desirable to arrange the storage elements to provide the highest bit density possible. In the past a close packing of the elements has proven to be a problem, particularly with respect to a nondestructive readout operation, because of stray fields and demagnetization fields existing between adjacent elements. If not avoided, these fields and related effects introduce error into the storage and readout processes, and also cause destruction of the storage elements in the nondestructive readout operation. One solution for avoiding the above noted harmful effects is to adequately space the individual storage elements of the film. For obvious reasons this is not a satisfactory solution.

Another approach is to cut down on the undesirable fields by decreasing the thickness of the magnetic field. This, however, results in exceedingly low output voltages requiring expensive high gain sense amplifiers having good noise cancellation properties.

It is an object of the present invention to provide a novel thin magnetic film storage device that effectively limits the stray fields and demagnetization fields within the device, thereby stabilizing the magnetization within individual storage elements and permitting an extremely high bit density to be stored.

It is another object of the invention to provide a novel thin magnetic film storage device having a completely closed magnetic path for each of the device's storage elements.

It is a further object of the invention to provide a thin magnetic film storage device of the above type that may be fabricated utilizing relatively simple techniques to provide a structure having close tolerances in its dimensions.

It is still a further object of the invention to provide a novel method of fabricating a thin magnetic film storage device of the type heretofore described.

These and other objects of the invention are accomplished in a storage matrix structure of the type having a thin magnetic film overlaying a supporting base plate and polarized so as to exhibit a remanent magnetization along a single axis. Within the film is formed an array of closely spaced storage elements, the remanent magnetization in each element being established in one of two opposing directions along said single axis so as to store a binary "1" or "0" information bit. In accordance with the invention upon each storage element is deposited a relatively thick conducting layer which supports a further thin magnetic film coupled to the opposing ends of each element that bound the element's remanent magnetization. The further thin film forms a closed magnetic flux path for each storage element which path extends out of the plane of said elements. A first plurality of current conductors is provided by the conducting layers. A second plurality of current conductors inductively coupled to the storage elements are provided which intersect said first plurality and are orthogonally disposed with respect thereto. Said first and second plurality of conductors are energized for controlling the magnetization state within each storage element in the writing and readout processes.

Further in accordance with the invention, the method for fabricating the above described structure includes the following steps: An extremely thin, smooth substrate layer of highly conductive material, such as gold, is deposited upon one planar surface of a glass base plate to a thickness of about 200–300 angstrom units. Upon the conductive layer there is electroplated a thin magnetic film, such as of a nickel-iron permalloy, which is applied in the presence of a polarizing magnetic field so as to introduce to the film a magnetic anisotropy manifested by a remanent magnetization along the single axis previously referred to. The thin magnetic film has a thickness of about 600 to 1,000 angstrom units. Upon the magnetic film is electroplated a relatively thick layer of conducting material, such as copper, on the order of one half mil. Parallel strips are next formed of the superimposed layers by an etching process, in a direction along the axis transverse to said single axis. Over the formed parallel strips is electroplated a further thin magnetic film for enclosing said strips and providing a continuous path of thin magnetic material around the copper and coupled to the previously deposited thin film. An insulating film, for example of sprayed epoxy, is coated over the surface thus far formed. Upon the insulating film is deposited a further substrate layer of highly conductive material, and upon this is electroplated a relatively thick layer of conducting material. Finally, an etch process is employed for forming strips of this last formed conducting layer in the direction of said single axis.

Figure 2:
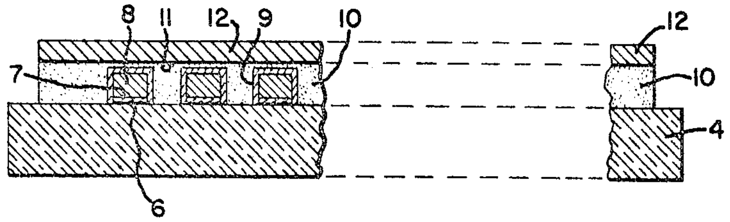
Figure 3:
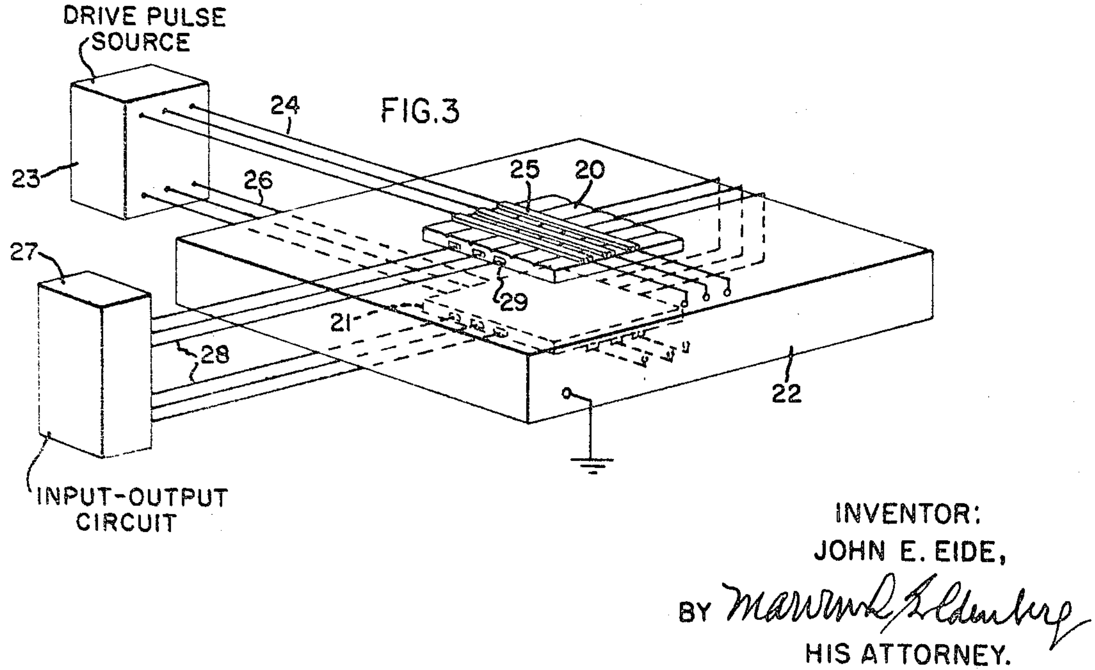

While the specification concludes with claims which set forth the invention with particularity, it is believed that the invention, both as to its oragnization and method of operation, will be better understood from the following description taken in connection with the accompanying drawings in which:

FIG. 1 is a plan view in schematic form of a thin magnetic film storage device in accordance with the invention, FIG. 2 is a cross sectional view of the device of FIG. 1 taken along the line 2—2; and FIG. 3 is a perspective view in schematic form of a modified embodiment of the invention wherein a pair of storage devices are mounted on a common ground plate.

Referring now to FIGS. 1 and 2, there is illustrated a partially broken away plan view and a cross sectional view, respectively, of a thin magnetic film storage device 1 having number of thin film storage elements 2. For purposes of illustration only a limited number of storage elements in a greatly enlarged view are shown. As illustrated in FIG. 1, the device 1 includes a plurality of parallel columns 3 supported upon a base plate 4 of amorphous dielectric material, such as glass. The columns 3 are overlaid by a plurality of parallel rows 5.

In FIG. 2 it is seen that each column 3 includes a smooth substrate layer 6 of highly conductive material formed on the glass surface. Gold or a gold copper alloy having a thickness of 200 to 300 angstrom units has been found very suitable for this layer. Upon the gold layer 8 is a thin magnetic film 7. The film 7 is typically of a nickel-iron permalloy material having a thickness on the order of 600 to 1,000 angstrom units. As will be presently explained in detail, the nickel-iron permalloy film is deposited so as to possess anisotropic magnetic properties.

A conductive material 8 overlays the magnetic film. The layer 8 is relatively thick for conducting current through its length, being normally of copper with a thickness on the order of one half mil. A covering layer 9 in the form of a thin magnetic film, also typically a nickel-iron permalloy, overlays three sides of the conductor 8 and intimately contacts the ends of the thin film 7. Accordingly, there is formed a continuous closed path of thin magnetic film, consisting of layers 7 and 9, which encloses the conductor 8.

Overlaying the columns 3 is an insulating layer 10, which may be a sprayed epoxy. A layer 11 of highly conductive material similar to the layer 6 is formed upon the insulating material. Each row 5 includes solely a relatively thick layer 12 of conducting material, similar to layer 8, which is formed over the columns 3 and separated from the conducting material of said columns by the insulating coating.

Considering the operation of the thin magnetic film storage device of FIGS. 1 and 2, the layers 8 serve as a first plurality of conductors of energizing current inductively coupled to the thin film 7, and the layers 12 serve as a second plurality of inductively coupled conductors of energizing current, which conductors are orthogonally disposed with respect to said first plurality of conductors. The individual storage elements 2 of the device are formed within the film 7 under the intersections of the conductors of said first and second plurality. In the formation of the thin magnetic film 7 a D-C magntic field is applied so as to polarize the magnetic film in one direction and thereby cause it to exhibit a remanent magnetization existing along a single axis, termed the "easy" axis. The orientation of the "easy" axis and the "transverse" axis with respect to the structure of FIG. 1 is indicated.

The conductors 8 serve in a dual capacity as both digit and sense lines. Conductors 12 serve as drive lines. Information in the form of binary "1" or "0" bits is stored within the storage elements 2 as magnetization vectors oriented in one of two opposing directions along the "easy" axis. When writing information a selected drive line is energized by a unipolar pulse signal, from an appropriate pulse source not shown, so as to produce a magnetic field along the "transverse" axis within each of the storage elements under the energized drive line. This pulse is of sufficient energy so as to effectively rotate the magnetization vector within the storage elements away from the "easy" axis and towards the "transverse" axis. Concomitantly with the application of the drive pulse there is applied to a single digit-sense line 8, when information is to be entered into a single storage element, a bipolar digit pulse the polarity of which is in accordance with the binary information to be stored. The digit pulse is also applied from a suitable source, not shown. It is noted that a common operation is to simultaneously enter information into an entire row of storage elements, in which case all digit lines are energized together. The strength of the drive pulse should be great enough so that in combination with the digit pulse the magnetization vector of the excited storage element will rotate by 180° where the digit pulse so directs, but not so great as to be able to reverse the magnetization vector by its application alone.

Once information is stored within the various storage elements of the device 1, it may be read out by pulsing the drive lines. In a conventional operation, an entire row of storage elements is read out simultaneously by energizing a given drive line, the outputs being obtained from the digit-sense lines. Thus, entire words or groups of words are read out at one time. In response to energization of a given drive line, the magnetization vectors of the storage elements under said line rotate away from the "easy" axis and upon release of the drive pulse return to their original position. The rapid change in magnetization induces a voltage in the associated digit-sense conductors having a polarity that is a function of the stored information.

In one specific embodiment that has been constructed and operated in a nondestructive mode, the storage element strips were approximately one inch long, .01 inch wide and located on centers spaced .02 inch apart. Thus, an overall bit density of 2500 bits per square inch was obtained. The digit current pulses were 100 milliamperes and the drive current pulses 300 milliamperes. The sensed output voltage was one millivolt at 15 nanoseconds rise time.

The thin magnetic film structure above described is fabricated in the following novel manner: The smooth surface of the glass base plate is first coated with a very thin, smooth layer of highly conductive material, which in the specific example being considered is gold or a gold alloy, but can also be one of the other noble metals. In order to have the gold adhere to the glass surface, there is first cathode sputtered onto the surface a thin layer of nickel-chromium, or comparable material, having a thickness of 100 to 200 angstrom units. The gold is then sputtered onto the nickel-chromium film to a thickenss of about 200 to 300 angstrom units. In the next step of the process, a thin magnetic film on the order of 600 to 1,000 angstroms thick, which in the process under consideration is specifically a nickel-iron permalloy, is electroplated onto the gold substrate in the presence of a D-C magnetic field which polarizes the magnetic film along the "easy" axis. Electroplating provides a carefully controlled deposition technique, forming film of close tolerances. It is noted that the deposition of the gold substrate is necessary only for the purpose of accommodating the electroplating process in the deposition of the magnetic film. Should another known technique be employed for forming close tolerance thin magnetic films, such as a vapor deposition or an electrochemical deposition, the magnetic permalloy film can be deposited directly onto the glass surface. The deposition of the magnetic permalloy onto the smooth surface of the substrate produces a soft magnetic film having a relatively low saturation flux compared to that of a hard magnetic film. The latter is produced by depositing the magnetic permalloy onto a surface that is not perfectly smooth.

Upon the layer of magnetic film is electroplated a relatively thick layer of copper of suitable current conducting material, about one half mil in thickness. An etch process is then employed for forming parallel strips of the superimposed thin magnetic film and copper layers aligned along the "transverse" axis. One suitable etching technique is to employ a photographic process wherein a KPR photoresist material is applied to the copper surface. The surface is then exposed to a source of light through a mask having parallel slits. The assembly is then immersed in a solution, such as ferric chloride, which dissolves the unexposed areas down to the glass surface.

In the next step of the process, a second thin layer of nickel-iron permalloy material is deposited completely over the three external longitudinal surfaces of the formed strips by an electroplating process to a controlled thickness of about 600 to 1000 angstrom units. The magnetic film adheres only to the copper and the ends of the soft magnetic film comprising the storage elements. The deposition of the magnetic permalloy onto the relatively unsmooth copper surface produces a hard magnetic film. The hard magnetic film provides the closed magnetic flux path for the magnetization with the storage elements and thus acts as a "keeper" of the stored magnetization. An insulating material is then deposited over the surface formed thus far, which may be done by a sprayed epoxy. Upon the insulating surface is then cathode sputtered a nickey-chrominum film and upon that a gold film in a similar manner to that previously described. Upon the gold substrate is then electroplated a second relatively thick copper layer, or similar current conducting material. A second etch process is next performed, similar to that previously described, for forming parallel strips of said second copper layer in a direction along the "easy" axis.

With reference to FIG. 3, there is illustrated a further embodiment of the invention wherein a pair of thin magnetic film storage devices 20 and 21, of the same type as shown in FIGS 1 and 2, are bonded onto opposite broad surfaces of a common ground plate 22, which is suitably of copper. As schematically shown, a source 23 of drive pulses is connected by conductors 24 to drive lines 25 of device 20, one end of drive lines 25 being grounded. Similarly, source 23 is connected by conductors 26 in the drive lines of device 21. An input-output means 27, providing input digit pulse during the writing operation and responsive to output pulses during readout, is connected by conductors 28 to commonly connected digit-sense lines 29.

In the operation of the device, information is stored in device 20 by pulsing drive lines 25 and digit-sense lines 29. Information is stored in device 21 by pulsing its drive lines and digit-sense lines 29. Correspondingly, information may be read out from the two storage devices by separately pulsing their respective drive lines. The operation is otherwise similar to that previously described with respect to a single device.

Although the invention has been described with respect to specific operable embodiments for the purpose of complete and clear disclosure, it is recognized that numerous modifications may occur to ones skilled in the art which do not exceed the basic inventive concepts herein presented. Accordingly, the appended claims are intended to include within their means all modifications and variations that reasonably full within the invention's true scope.

What I claim as new and desire to secure by Letters Patent of the United States is:

1. A method of fabricating a thin magnetic film storage device comprising the steps of:

(a) depositing a magnetic permalloy material on the smooth surface of a base plate in the presence of a D-C magnetic field so as to form upon said base plate an anisotropic thin magnetic film having a remanent magnetization along a single axis in the plane of said film, (b) depositing a relatively thick conducting layer on the top surface of said thin magnetic film, (c) etching the superimposed layers thus far formed upon the base plate along parallel lines extending transversely with respect to said single axis so as to form parallel strips of said superimposed layers, and (d) electroplating a magnetic permalloy material as a thin magnetic film in direct contact with said superimposed layers over the top and longitudinal side surface of the formed parallel strips so as to produce a closed magnetic flux path around the conducting layer of each strip.

2. A method of fabricating a thin magnetic film storage device as in claim 1 wherein the step of depositing a magnetic permalloy onto the base plate surface includes depositing a thin film of noble metal onto the base plate surface prior to electroplating said anisotropic thin magnetic film upon said noble metal film.

3. A method of fabricating a thin magnetic film storage device as in claim 2 additionally comprising depositing an insulating layer over said forced parallel strips depositing a further relatively thick conducting layer over said insulating layer and etching said further conducting layer along parallel lines extending along said single axis so as to form parallel conductor strips orthogonally disposed with respect to the underlying parallel strips.

References Cited

UNITED STATES PATENTS

| | | | |
|---|---|---|---|
| 3,278,913 | 10/1966 | Raffel | 340—174 |
| 3,375,503 | 3/1968 | Bertelsen | 340—174 |
| 3,461,438 | 8/1969 | Chang et al. | 340—174 |

TA-HSUNG TUNG, Primary Examiner

T. TUFARIELLO, Assistant Examiner

U.S. Cl. X.R.

29—625; 340—174